(12) United States Patent
Cheron et al.

(10) Patent No.: US 11,333,126 B2
(45) Date of Patent: May 17, 2022

(54) ELECTRICAL POWER FROM PERIPHERAL DEVICES

(71) Applicant: Draco Enterprises, LLC, McKinney, TX (US)

(72) Inventors: Bruno Jean Michel Cheron, McKinney, TX (US); Xuan Song, McKinney, TX (US); Helene Jiaqi Amy Cheron, McKinney, TX (US)

( * ) Notice: Subject to any disclaimer, the term of this patent is extended or adjusted under 35 U.S.C. 154(b) by 0 days.

(21) Appl. No.: 16/932,528

(22) Filed: Jul. 17, 2020

(65) Prior Publication Data

US 2022/0018326 A1    Jan. 20, 2022

(51) Int. Cl.
  F03B 17/06    (2006.01)
  F03B 13/10    (2006.01)

(52) U.S. Cl.
  CPC ............ F03B 17/061 (2013.01); F03B 13/10 (2013.01); F05B 2210/11 (2013.01)

(58) Field of Classification Search
  CPC ..... F03B 17/061; F03B 13/10; F05B 2210/11
  USPC ...................................................... 290/43, 54
  See application file for complete search history.

(56) References Cited

U.S. PATENT DOCUMENTS

| | | | | |
|---|---|---|---|---|
| 2,448,284 A * | 8/1948 | Staples | ...................... | H02P 9/04 290/17 |
| 3,070,108 A * | 12/1962 | Fischer | .................. | A62B 9/022 137/102 |
| 3,851,661 A * | 12/1974 | Fernandez | ........... | G05D 7/0113 137/558 |
| 4,157,159 A * | 6/1979 | Modes | .................... | G05D 7/014 137/489 |
| 5,209,650 A * | 5/1993 | Lemieux | ................. | F01D 15/10 384/115 |
| 6,011,334 A * | 1/2000 | Roland | ..................... | H02K 7/11 290/43 |
| 6,407,465 B1 * | 6/2002 | Peltz | ....................... | H02P 9/305 290/43 |
| 8,957,540 B2 | 2/2015 | Focchi et al. | | |
| 2002/0179154 A1 * | 12/2002 | Taylor | ................... | F16K 15/026 137/541 |
| 2003/0178205 A1 * | 9/2003 | Henderson | .............. | E21B 23/04 166/387 |
| 2005/0011278 A1 * | 1/2005 | Brown | ................. | G01N 29/036 73/861.18 |

(Continued)

OTHER PUBLICATIONS

Name: cla-val.com Product: Power Generators Website:https://www.cla-val.com/electronic-power-generators Publication Date: © 2020.

(Continued)

*Primary Examiner* — Charles Reid, Jr.
(74) *Attorney, Agent, or Firm* — Cynthia S. Lamon; Lamon Patent Services

(57) ABSTRACT

A fluid flow device has a body with a mechanism for altering state of a fluid flowing through the device, an inlet conduit providing inlet of the flowing fluid to the body of the device, an outlet conduit providing outlet of the flowing fluid from the body of the device, and a micro-generator assembly installed in either the inlet conduit or the outlet conduit, the micro-generator assembly having an impeller driven by the flowing fluid, the impeller turning a shaft driving a generator producing a voltage across two output conductors.

16 Claims, 3 Drawing Sheets

(56) References Cited

U.S. PATENT DOCUMENTS

| | | | | | |
|---|---|---|---|---|---|
| 2008/0022920 | A1* | 1/2008 | Custodis | ............ | F03B 13/00 116/202 |
| 2008/0190488 | A1* | 8/2008 | Hurst | ............ | F16K 31/04 137/119.03 |
| 2009/0179426 | A1* | 7/2009 | Alvarez | ............ | F03B 13/00 290/54 |
| 2010/0050638 | A1* | 3/2010 | Ogino | ............ | F01D 15/10 60/670 |
| 2010/0071786 | A1* | 3/2010 | Hawkins | ............ | G05D 16/02 137/485 |
| 2013/0206242 | A1* | 8/2013 | Hurst | ............ | G05D 7/03 137/12 |
| 2014/0090726 | A1* | 4/2014 | Hawkins | ............ | G05D 16/0683 137/505.13 |
| 2014/0261724 | A1* | 9/2014 | Fan | ............ | F16K 31/1262 137/15.01 |
| 2015/0176372 | A1* | 6/2015 | Winslow | ............ | H02K 7/1807 290/1 R |
| 2015/0322857 | A1* | 11/2015 | Ethier | ............ | F02C 7/08 290/2 |
| 2015/0362086 | A1* | 12/2015 | Christensen | ............ | F16K 27/0209 137/539 |
| 2020/0300083 | A1* | 9/2020 | Fellinghaug | ............ | E21B 47/14 |

OTHER PUBLICATIONS

Name: bermad.com Product: Control Valves Website:https://www.bermad.com/products/waterworks/control-valves/ Publication Date: 2020.

Name: watts.com Product: Automatic Control Valves Website: https://www.watts.com/products/plumbing-flow-control-solutions/automatic-control-valves Publication Date: © 2020.

Name: dorot.com Product: All functions. Any Valve. One Controller. Website:https://www.dorot.com/Files/Files/Dorot/EngineersLibrary/Catalogs/Condor/Condor-Brochure-Eng.pdf Publication Date:Apr. 2018.

Name: singervalve.com Product: Main Valves Website:https://www.singervalve.com/main-control-valves Publication Date: © 2020.

* cited by examiner

ELECTRICAL POWER FROM PERIPHERAL DEVICES

BACKGROUND OF THE INVENTION

1. Field of the Invention

The present invention is in the technical area of conduits and mechanical and electromechanical devices used in conduits and pipelines.

2. Description of Related Art

Long distance translation of liquids via conduits, such as oil, steam, water, and other substances, by systems known in the art as pipelines, or utility distribution is well-known. Natural gas or methane and oil is a good example of use of a long distance pipeline. Natural gas is found by exploration and oil fields are rarely located where refineries are established, so natural gas pumped from oil fields below ground has to somehow be transported to where refineries and storage facilities are already in service, and refined products have to then be transported to distribution points and end users. There are a variety of ways that this transportation may be accomplished, such as seagoing vessels, tanker trucks, and by pipes laid aboveground or underground over relatively long distances.

Municipal water systems and steam distribution systems are examples of such transport of liquid or gas over relatively long distances. Steam at one time was conventionally produced in a local power plant, and distributed over a municipal area to heat commercial buildings and private residences. Municipal water systems are well known.

The means of long distance transport by pipeline is driven by financial concerns, the least expensive way is usually the way chosen and implemented. Pipelines aren't just pipes, of course. The fluid sent along in a pipeline has to be propelled by pumps that create large pressure differentials between points along the way. It is well known in the art of fluid dynamics that elevation, friction, and inertia must be overcome in the pumping process, and these phenomena work to decrease fluid pressure along the way, such that a long pipeline may have to have a considerable number of pumping stations where mechanical or electrical power must be provided to drive the pumps to re-establish necessary pumping pressure. The power at pumping stations is typically provided by internal combustion or turbine engines directly driving pumps or driving electrical generators creating electricity to drive the pumps.

Between pumping stations in a typical pipeline there is often a need for monitoring and regulation of pressure, testing for leaks, switching flow by mechanically operable valves, and also a need for gathering and transmitting data regarding all this functionality. In the conventional art there are many such devices along a pipeline system, and these devices in most circumstances also require power, but at a much reduced rate than for pumping stations. These devices are typically installed and forgotten.

In municipal utility systems, such as steam, natural gas and water, there is also a need in many places for valves to divert fluid from one path to another, pressure regulation, accomplished by pressure regulators, and, in steam systems, steam traps. A steam trap is a device used to discharge condensates and non-condensable gases with a negligible consumption or loss of live steam. Steam traps are nothing more than automatic valves. They open, close, or modulate automatically.

Power for these peripheral devices along a pipeline system or utility distribution may, if a device requires power, be by hardwired connection (expensive) or in many circumstances by battery power. Batteries may be connected to, for example, solar panels to recharge, but eventually the batteries will need to be replaced in any case, so mechanical and electrical power may be needed along a pipeline at other than at just the primary pumping stations, albeit at a lower power level than may be needed at the pumping stations. In the case of many devices that do not require external power for operation, if electrical power were available, the reliability and functionality of such devices might be improved.

What is clearly needed is a system for providing power at a plurality of points along a pipeline or utility distribution.

BRIEF SUMMARY OF THE INVENTION

In an embodiment of the invention a fluid flow device is provided comprising a body having a mechanism for altering state of a fluid flowing through the device, an inlet conduit providing inlet of the flowing fluid to the body of the device, an outlet conduit providing outlet of the flowing fluid from the body of the device, and a micro-generator assembly installed in either the inlet conduit or the outlet conduit, the micro-generator assembly having an impeller driven by the flowing fluid, the impeller turning a shaft driving a generator producing a voltage across two output conductors.

In one embodiment the fluid flow device further comprises electrical pass-through through a wall of the inlet or the outlet conduit where the micro-generator is installed. Also, in one embodiment the micro-generator assembly produces a Direct Current (DC) voltage adequate for regulation to 12V DC. In one embodiment the fluid flow device further comprises circuitry external to the body, the circuitry comprising a voltage regulator and sensing circuitry powered by the voltage regulator enabled to monitor one or both of pressure and temperature at one or more points within the body of the device.

In one embodiment the fluid flow device further comprises one or more electric motors driving mechanisms in the device, circuitry external to the body comprising a voltage regulator, a micro-processor, and a data repository coupled to the micro-processor: the micro-processor executing software providing command outputs to operate the one or more electric motors. Also in one embodiment the fluid flow device further comprises one or more electric solenoids operating mechanisms in the device, circuitry external to the body comprising a voltage regulator, a micro-processor, and a data repository coupled to the micro-processor: the micro-processor executing software providing command outputs to drive the one or more electric solenoids. Also, in one embodiment the fluid flow device further comprises wireless communication circuitry in the circuitry external to the body, the wireless communication circuitry coupled to the micro-processor, wherein status reports are sent via the wireless communication circuitry to and from remote locations.

In one embodiment the device is a pressure regulator. In one embodiment the device is a steam trap. And in one embodiment the device is a valve.

In another aspect of the invention, a method for generating electrical power with a fluid flow device is provided, comprising installing a micro-generator assembly in either an inlet conduit or in an outlet conduit of a body of a fluid flow device, the micro-generator assembly having an impeller driven by flowing fluid, the impeller turning a shaft driving a generator producing a voltage across two output conductors, and passing the output conductors over a pass-through in a wall of the conduit of the inlet or the outlet conduit.

In one embodiment of the method micro-generator assembly produces a Direct Current (DC) voltage adequate for regulation by an on-board voltage regulator to 12V DC. Also, in one embodiment the method further comprises monitoring one or both of temperature and pressure at one or more points within the body of the device by sensor circuitry powered by the voltage regulator. And in one embodiment the method further comprises driving one or more mechanisms in the device by an electric motor powered by the voltage regulator.

In one embodiment the method further comprises commanding operation of electrical mechanisms by a micro-processor powered by the voltage regulator executing software. In one embodiment the method further comprises commanding operation of one or more electric solenoids operating mechanisms in the device. In one embodiment the method further comprises creating a sending status reports by the micro-processor through wireless communication circuitry in the circuitry external to the body. And in one embodiment the device is one of a pressure regulator, a steam trap, or a valve.

DETAILED DESCRIPTION OF THE INVENTION

Figure 1:
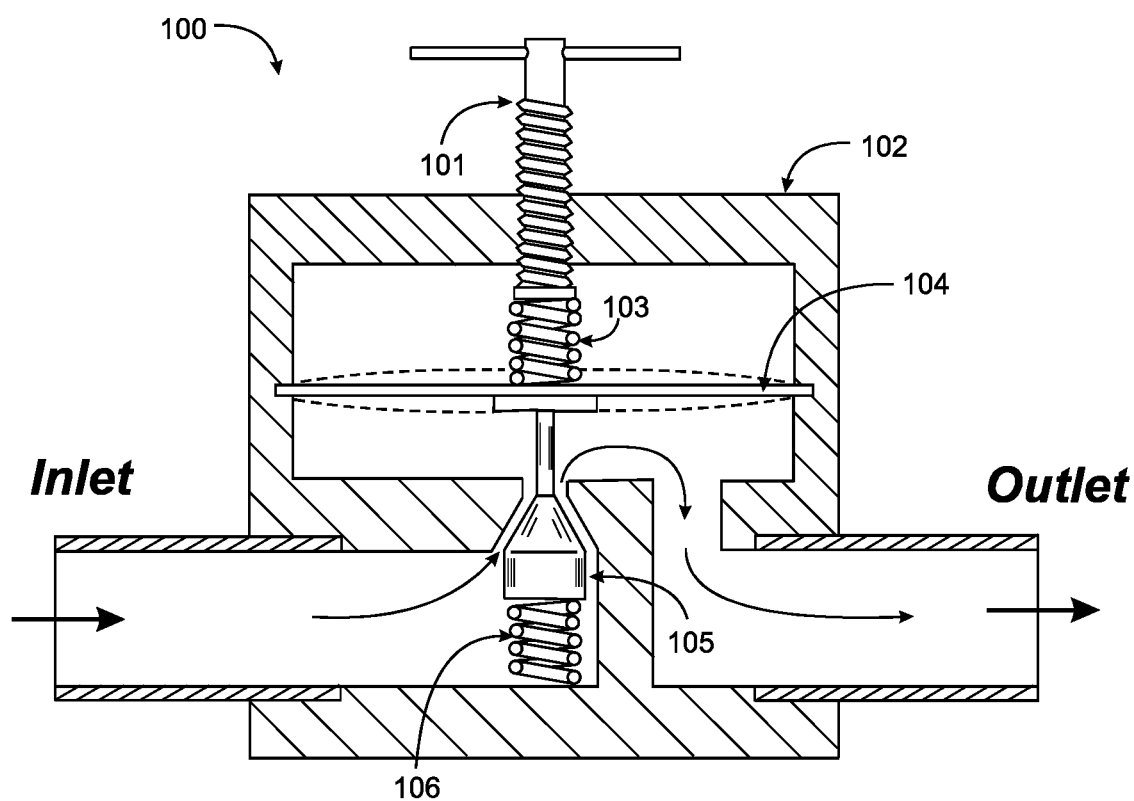
FIG. 1 is an illustration of a pressure regulator in conventional art.

FIG. 1 is an illustration of a pressure regulator 100 as might be used in a fluid transfer system in conventional art. Regulator 100 has a body 102 shown primarily in section. There is a threaded pressure adjusting screw 101 through an upper part of the body of the regulator, bearing against a first coil spring 103 and against a diaphragm 104. A conical plug 105 is movable up and down against a second spring 106 to adjust cross section area through an adjustable orifice. Moving the pressure adjusting screw to close the orifice lowers outlet pressure, and opening the orifice raises the outlet pressure.

FIG. 1 represents a relatively simple pressure regulator. There are many other models and types of such regulators, such as regulators dedicated to gas flow and others dedicated to liquid, like water, but all are common in having an inlet and an outlet and an orifice that is adjustable to partially open and close, increasing or decreasing flow. There exist in the art also a number of other peripheral devices similar to the pressure regulator of FIG. 1, for example steam traps in steam distribution utilities.

It is well known that a large number of devices like the pressure regulator of FIG. 1 are used liberally in pipelines, refineries, water and steam distribution, and in many other places as well. Typically devices of this sort are installed and seldom serviced. Some may be electrically actuated, such as to adjust the pressure regulator or some other function, and may require battery power or hard-wired conductors supplying power. Many more are purely mechanical, like the regulator of FIG. 1.

The present inventor has envisioned devices of this sort capable of generating their own power, or generating power for other closely-related purposes. Devices for generating low-voltage electric power (typically, at 24V) using the energy provided by a source of air under pressure are currently known in the art. Such devices basically comprise an electric generator, a radial micro-turbine coupled for rotation with the rotor of the electric generator, and a nozzle through which air under pressure is directed against blades of the micro-turbine so as to drive the micro-turbine into rotation, along with the rotor of the electric generator, thereby producing electric power from the pressure and kinetic energy of the flow of air under pressure. Such devices further comprise an electronic control unit arranged to ensure a constant output voltage independently of changes in the electric load connected to the device and in the pressure of the air under pressure supplied to the device. A micro-generator is known to the inventor. One such device is subject of U.S. Pat. No. 8,957,540, to inventor Focchi on Feb. 17, 2015.

The Focchi micro-generator is relatively complicated and of a size too bulky for most applications in the present invention, but the inventor has developed versions of such a micro-turbine to fit different applications according to embodiments of the present invention.

Figures 2A, 2B:
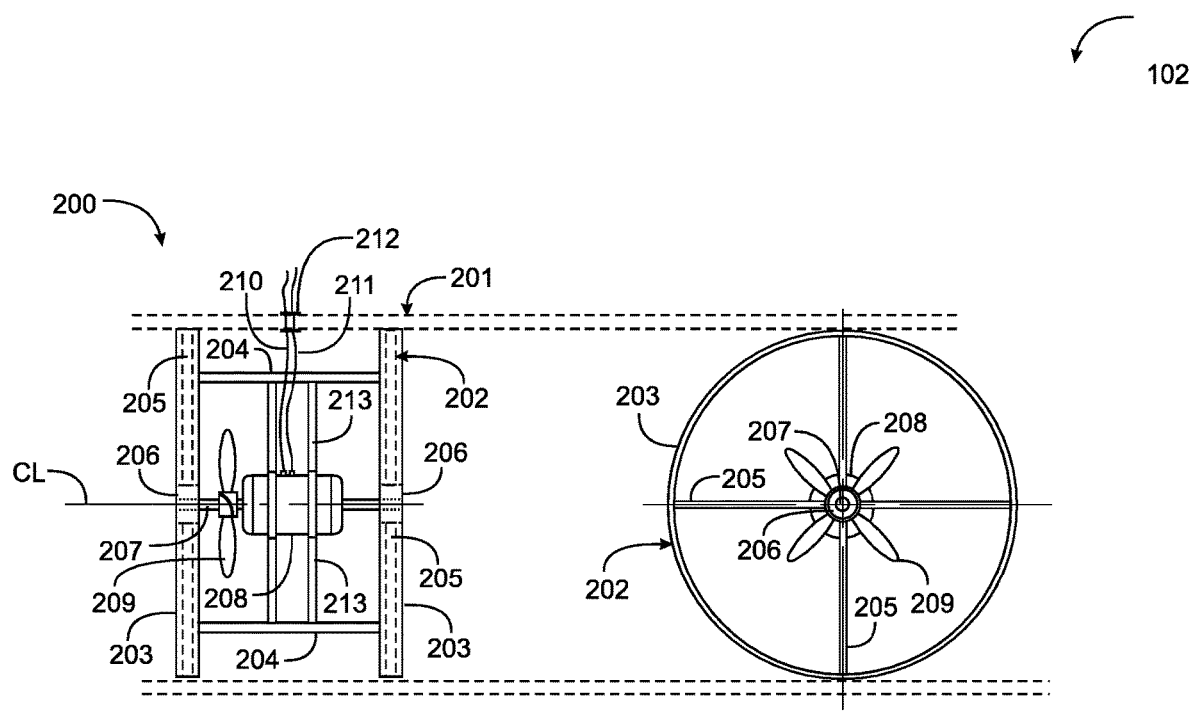
FIG. 2A is a side elevation view of a micro-generator assembly in an embodiment of the invention.
FIG. 2B is a front elevation view of the micro-generator assembly of FIG. 2A.

FIG. 2A is an elevation illustration of a side view of a micro-generator and support assembly 200 in an embodiment of the invention, to position inside a conduit or pipe, represented by dotted lines 201, and FIG. 2B is a face-on view of the assembly of FIG. 2A along centerline CL. Assembly 200 in this example comprises a framework 202 having two cylindrical support elements 203 spaced apart by four longitudinal struts 204. Four equally spaced radial struts 205 extend from support elements 203 to two journal bearings 206, one concentric with each support element 203 and on centerline CL through the support elements 203. A shaft 207 is engaged in each journal bearing 206 enabling the shaft to rotate freely about centerline CL.

In this example an impeller 209 is engaged to shaft 207 and shaft 207 passes through a micro-generator 208. Micro-generator 208 has a stator having stator windings in a body joined to struts 213 such that the stator is held stationary. There is a rotor that turns relative to the stator and is connected to shaft 207 that may be turned by impeller 209. Fluid, either gaseous or liquid, passing through conduit 201 may turn impeller 209, hence shaft 207 and the rotor of the micro-generator, producing a voltage across output conductors 210 and 211 that proceed from the micro-generator. The voltage generated needs be sufficient to regulate to 12V DC or 24V DC. The regulation circuitry is not shown in FIG. 2A or FIG. 2B. Lines 210 and 211 proceed to an electrical pass-through 212 that enables the voltage to be presented on lines outside conduit 201.

It is apparent in this embodiment that this apparatus may be provided in a variety of different forms, depending on several variables, such as what sort of medium is passing through conduit 201, and the nature of a device in which the micro-generator assembly is to be placed. The medium might by liquid and viscous, like oil, or liquid and less viscous, like water. The shape of the impeller may be altered accordingly. The medium might well be gaseous, like air, or vapor, like steam, and the impeller may be provided accordingly. Materials may need to be chosen with application in mind as well, but a micro-generator suitable for many different applications may be developed and provided.

Figure 3:
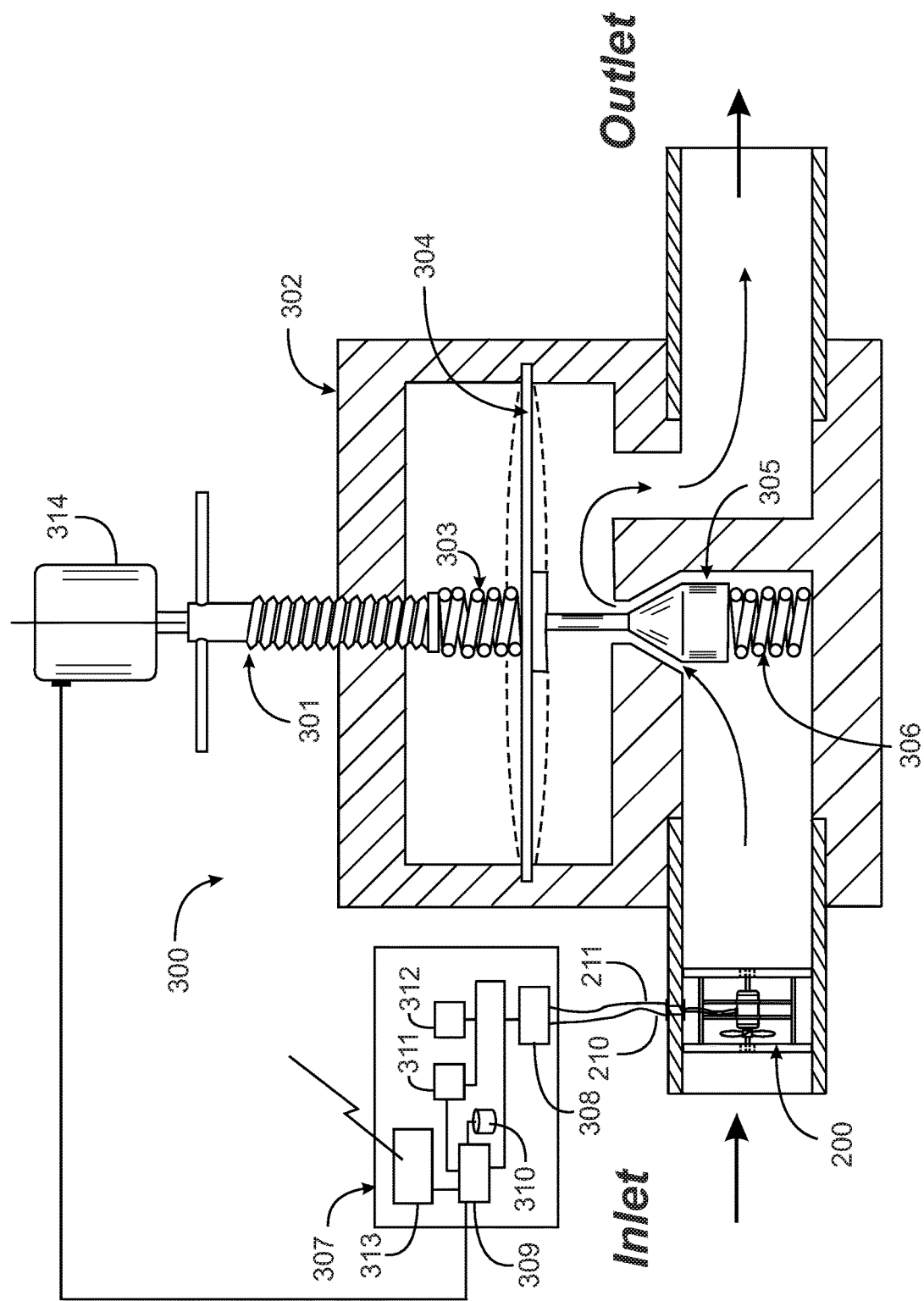
FIG. 3 is an illustration of a pressure regulator similar to the regulator of FIG. 1, integrated with a micro-generator and support assembly.

FIG. 3 is an illustration of a pressure regulator 300 similar to regulator 100 of FIG. 1, integrated with micro-generator and support assembly 200 of FIGS. 2A and 2B. Regulator 300 has adjusting screw 301, a body 302, an upper compression spring 303, a diaphragm 304, an adjustable plug 305 (for adjusting the pressure-reducing orifice), and a second spring 306. In this example a micro-generator assembly 200 according to an embodiment of the instant invention is installed in the inlet of regulator 300, with output of the micro-generator being passed through a wall of the inlet pipe.

In the example the design is such that the output across conductors 210 and 211 is of a value that may be regulated outside of conduit 201 to a regulated voltage that may be used for electronic equipment, such as computers and computer peripheral devices.

In this example a circuitry assembly 307 is also integrated with regulator 300, and has a voltage regulator 308 connected to output lines 210 and 211 of the micro-generator. Circuitry 307 in this example comprises a micro-processor 309 coupled to a data repository 310, as well as, temperature sensing circuitry 311, and pressure sensing circuitry 312. The temperature and pressure sensing circuitry is connected to sensors (not shown) installed in the regulator, and may be connected to sensors elsewhere, near the regulator. Examples of additional sensors that are not shown may include accelerometers detecting vibrations and sensors having means to measure, directly or indirectly, displacement of the fluid, either gaseous or liquid, passing through conduit 201, for example, displacement based pressure sensors and/or sensors having means to measure, directly or indirectly, the displacement of the plug 305 and/or of the diaphragm 304.

In this example wireless communication circuitry 313 is coupled to the micro-processor, and may establish communication with a nearby base station or in some embodiments may connect to the internet network. Executing software on micro-processor 309 the system described may monitor status of regulator 300 and report status to remote stations.

In an alternative embodiment there may be a DC electric motor 314 operating adjusting screw 301, and micro-processor 309 may switch power to the motor 314, and pressure regulation may be automated and be remotely adjustable by command signals from a remote station through micro-processor 309.

As was described above, there exist in many transmission and distribution systems a variety of peripheral devices like pressure regulator 100. Regulator 100 and regulator 300 integrated with micro-generator assembly 200 are examples of a broader variety of such devices that might benefit from application of embodiments of the present invention. A micro-generator assembly like that illustrated in FIGS. 2A and 2B may be integrated with such devices by adding the assembly to a point in piping where fluid flow is adequate to generate DC voltage. Devices thus integrated may be self-powered, self sensing and may report their status to the outside world without having to be remotely powered.

The skilled artisan will understand that the embodiments described above are entirely exemplary, and that many other embodiments may be developed that fall well within the scope of this invention. The scope of the invention is limited only by the claims.

The invention claimed is:

1. A flow regulation system, comprising:
a flow regulator having a body, within a pipeline, having one or more mechanisms for altering state of a substance including fluid or gas flowing through the system, including at least a coil spring operating against a diaphragm;
an inlet, providing inlet of the flowing substance to the body of the regulator;
an outlet, within the pipeline, providing outlet of the flowing substance from the body of the regulator;
a micro-generator assembly installed in either the inlet or the outlet, the micro-generator assembly having an impeller driven by the flowing substance, the impeller turning a shaft driving a generator producing a voltage across two output conductors; and
a circuitry comprising a voltage regulator and sensing circuitry powered by the micro-generator assembly enabled to monitor substance pressure and temperature at one or more points within the system.

2. The flow regulation system of claim 1 further comprising an electrical pass-through through a wall of the inlet or the outlet where the micro-generator is installed.

3. The flow regulation system of claim 1 wherein the micro-generator assembly produces a Direct Current (DC) voltage adequate for regulation to 12V DC.

4. The flow regulation system of claim 1 further comprising an electric motor driving the one or more mechanisms of the flow regulator, a micro-processor, and a data repository coupled to the micro-processor, the micro-processor executing software providing command outputs to operate the electric motor.

5. The flow regulation system of claim 1 further comprising a wireless communication circuitry in the circuitry external to the body, the wireless communication circuitry coupled to a micro-processor, wherein status reports are sent via the wireless communication circuitry to remote locations.

6. The flow regulation system of claim 1 wherein the regulator is a pressure regulator.

7. The flow regulation system of claim 1 wherein the regulator is a steam trap.

8. The flow regulation system of claim 1 wherein the regulator is a valve.

9. A method for generating electrical power with a flow regulation system, comprising:
installing a flow regulator within a pipeline, the flow regulator having a body and one or more mechanisms for altering state of a substance including any one of a fluid and gas flowing through the system, including at least a coil spring operating against a diaphragm;
installing an inlet, the inlet providing inlet of the flowing substance to the body of the regulator;
installing an outlet within the pipeline, the outlet providing outlet of the flowing substance from the body of the regulator;
monitoring a pressure and temperature of the substance at one or more points within the system via a voltage regulator and sensing circuitry; and
powering the circuitry via a micro-generator assembly installed in either the inlet or the outlet, the micro-generator assembly having an impeller driven by the substance, the impeller turning a shaft driving a generator producing a voltage.

10. The method of claim 9 further comprising installing an electrical pass-through enabling the two conductors to pass through a wall of the inlet or the outlet where the micro-generator is installed.

11. The method of claim 9 wherein the micro-generator assembly produces a Direct Current (DC) voltage adequate for regulation to 12V DC.

12. The method of claim 9 further comprising installing an electric motor driving the one or more mechanisms of the flow regulator, a micro-processor, and a data repository coupled to the micro-processor, the micro-processor executing software providing command outputs to operate the electric motor.

13. The method of claim 9 further comprising installing a wireless communication circuitry in the circuitry external to the body, the wireless communication circuitry coupled to a micro-processor, wherein status reports are sent via the wireless communication circuitry to remote locations.

14. The method of claim 9 wherein the regulator is a pressure regulator.

15. The method of claim 9 wherein the regulator is a steam trap.

16. The method of claim 9 wherein the regulator is a valve.

* * * * *